Patented May 16, 1933

1,909,465

UNITED STATES PATENT OFFICE

WALDEMAR C. HANSEN, OF WESTFIELD, AND PAUL C. SCHROY, OF ELIZABETH, NEW JERSEY, ASSIGNORS TO STRUCTURAL GYPSUM CORPORATION, OF LINDEN, NEW JERSEY, A CORPORATION OF DELAWARE

ACCELERATOR FOR PLASTIC MASSES AND METHOD OF USE

No Drawing.   Application filed September 24, 1929.   Serial No. 394,921.

This invention relates to an accelerator for decreasing the setting time of calcined gypsum or plaster of Paris, to a method of preparation of the accelerator and to the use of the same.

Ordinary calcined gypsum or plaster of Paris, to wit: $CaSO_4 \cdot \tfrac{1}{2}H_2O$ when mixed with sufficient water to cause hydration requires a length of time to secure the setting action, which ordinarily is too long in commercial practice for the production of cast shapes. It has been common practice heretofore to use various accelerators by incorporating the same in the mix to decrease the setting time. Among those most commonly used is potassium sulfate. It is desirable, however, to dispense with the use of this material, if possible, as its cost, even in large quantities, is relatively great.

We have found that if ordinary calcined gypsum or plaster of Paris is permitted to hydrate in the presence of an excess of water with agitation, this slurry forms in itself an excellent accelerator for calcined gypsum. While the dried slurry gives fairly good results, yet it is preferable to use the hydrated gypsum crystals in an acqueous menstruum.

To this end the invention contemplates the production of a mass of hydrated gypsum crystals by violently agitating calcined gypsum in an excess of water until the desired degree of hydration has taken place. This slurry may then be dried and used as an accelerator or it may be used in a wet or slurry form, preferably the latter.

In carrying out the invention it has been found satisfactory to violently agitate 25 to 30 parts of calcined gypsum in 100 parts of water until complete hydration has taken place. This requires in the neighborhood of two hours. Any desired type of apparatus may be used such, for instance, as a tank with rotating paddles or the like.

When complete hydration has taken place, that is, when all of the hemi-hydrate has been converted to the di-hydrate, the slurry becomes viscous due to the mass of minute crystals and these crystals settle very slowly.

A mix containing plaster of Paris and sufficient water to cause hydration has a set varying from 15 to 30 minutes but by incorporating 3% of the hydrated gypsum in slurry form, prepared as above, the time of set has been decreased to 8 minutes. Increasing the amount of accelerator to 5% decreases the set to 6 minutes. 7% of the above accelerator causes a satisfactory set in 5 minutes, and using 10% of the accelerator gives a set in approximately 4 minutes. For commercial use a 3% admixture of this accelerator is satisfactory as an 8-minute set is usual practice.

In addition to the advantage of decreasing the time of set, the use of this accelerator is desirable in that it increases the viscosity and consistency of the mix to an extent greater than when other accelerators are used, and thus permits a lighter block to be made without producing air bubbles on the surface.

The use of this accelerator is highly desirable in that shapes cast from a mix containing the same are 100% gypsum which is not true where other accelerators are used.

From the standpoint of the production of cast gypsum shapes, the use of this accelerator is to be desired over and above other accelerators in that a supply of calcined gypsum is always on hand and additional materials need not be purchased or stored.

In some instances it may be found desirable to use the hydrated gypsum slurry in connection with small percentages of potassium sulfate or the like. It has been possible to secure a 4½ minute set by using 5% of the hydrated gypsum in slurry form, together with 0.50% potassium sulfate.

While in this specification a very definite proportion of calcined gypsum and water have been specified to produce a slurry which may be used as an accelerator, yet obviously I do not wish to be limited thereto as these proportions have simply been given as the most desirable. This is also true of the other details of procedure set forth above, as it will be obvious to one skilled in the art that the particular work in hand will demand some variation of the conditions and hence the invention is to be construed broadly and is to be limited only by the scope of the claims.

We claim:

1. A method of setting calcined gypsum which consists in mixing the same with water and hydrated gypsum crystals suspended in water.

2. In a process of producing cast shapes of plaster of Paris, the steps which comprise forming a mix including calcined gypsum and sufficient water to cause hydration, with an aqueous slurry of hydrated calcium sulphate particles of substantially colloidal size in an amount sufficient to accelerate the normal set of such a mix.

3. In a process of producing cast shapes of plaster of Paris, the steps which comprise forming a mix including calcined gypsum and sufficient water to cause hydration and adding thereto an accelerator comprising an aqueous slurry containing fully hydrated calcium sulphate in suspension in an excess amount of water.

4. In a process of producing cast shapes of plaster of Paris, the steps which comprise forming a mix including calcined gypsum and sufficient water to cause hydration, and adding thereto an accelerator comprising from 3% to 10% of a slurry containing fully hydrated calcium sulphate in suspension in an excess amount of water.

5. An accelerator for decreasing the setting time of calcined gypsum comprising a slurry containing crystals of hydrated gypsum suspended in an excess amount of water.

6. A method of preparing a gypsum accelerator which consists in violently agitating calcined gypsum with an excess of water until the calcined gypsum has become fully hydrated and suspended therein.

7. A method of preparing a gypsum accelerator which consists in violently agitating calcined gypsum with an excess of water for from one to two hours.

8. A method of setting calcined gypsum which consists in mixing the same with water and a 10% admixture of a slurry containing hydrated gypsum crystals in suspension.

9. A method of setting calcined gypsum which consists in mixing the same with water and a 5% admixture of a slurry containing hydrated gypsum crystals in suspension.

10. A method of setting calcined gypsum which consists in mixing the same with water and a 3% admixture of a slurry containing hydrated gypsum crystals in suspension.

11. In a process of producing cast shapes of plaster of Paris, the steps which comprise violently agitating calcium sulphate hemihydrate in an excess amount of water until the hemihydrate has fully hydrated and becomes suspended and an aqueous slurry results, adding a sufficient quantity of this aqueous slurry to calcined gypsum and water, sufficient to hydrate the latter, in an amount sufficient to accelerate the normal set of calcined gypsum and water.

In testimony whereof, we have hereunto subscribed our names this 18th day of September 1929.

WALDEMAR C. HANSEN.
PAUL C. SCHROY.